United States Patent
Sagiv et al.

(10) Patent No.: US 12,455,903 B1
(45) Date of Patent: Oct. 28, 2025

(54) LARGE-SCALE DENSITY-BASED CLUSTERING

(71) Applicant: Microsoft Technology Licensing, LLC, Redmond, WA (US)

(72) Inventors: Inbal Sagiv, Kfar Saba (IL); David Dyckman, Bet Shemesh (IL); Oron Nir, Herzliya (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/679,988

(22) Filed: May 31, 2024

(51) Int. Cl.
*G06F 16/28* (2019.01)

(52) U.S. Cl.
CPC .................. *G06F 16/285* (2019.01)

(58) Field of Classification Search
None
See application file for complete search history.

(56) References Cited

U.S. PATENT DOCUMENTS

| | | | |
|---|---|---|---|
| 9,998,484 B1* | 6/2018 | Buyukkayhan | G06F 16/285 |
| 10,560,734 B2 | 2/2020 | Jassin | |
| 10,762,375 B2 | 9/2020 | Ronen | |
| 10,936,630 B2 | 3/2021 | Ronen | |
| 2010/0228754 A1* | 9/2010 | Shimakura | G06F 16/90339 |
| | | | 707/E17.014 |
| 2021/0174146 A1 | 6/2021 | Nir | |
| 2021/0232890 A1* | 7/2021 | Li | G06F 16/28 |
| 2022/0083885 A1* | 3/2022 | Wu | G06F 16/285 |

OTHER PUBLICATIONS

"Ternary search", accessed on link https://en.wikipedia.org/wiki/Ternary_search, Aug. 24, 2023, 2 pages.
Nir, et al., "CAST: Character labeling in Animation using Self-supervision by Tracking", arXiv:2201.07619v1, 2022, 19 pages.
Schubert, et al., "DBSCAN Revisited, Revisited: Why and How You Should (Still) Use DBSCAN", ACM Transactions on Database Systems, vol. 42, Issue No. 3, 2017, pp. 1-21.

* cited by examiner

Primary Examiner — Son T Hoang

(57) ABSTRACT

Systems and methods are provided for implementing large-scale density-based clustering functionalities. In examples, a system selects, for a dataset (which may be sampled at 100% or less), an upper bound value and a lower bound value of a neighborhood radius parameter of a density-based clustering algorithm. The system identifies, using a modified ternary search algorithm, an optimal neighborhood radius parameter value, based on the upper and lower bound values, outputs the optimal neighborhood radius parameter value and/or a corresponding optimal number of clusters within the dataset. The modified ternary search algorithm leverages the near-unimodality of the neighborhood radius parameter, while selection of the upper bound value leverages a characteristic in which the neighborhood radius parameter value increases as the sampling rate decreases, and selection of the lower bound value uses ternary search that takes the number of clusters as a parameter instead of the neighborhood radius parameter.

20 Claims, 8 Drawing Sheets

200B

LARGE-SCALE DENSITY-BASED CLUSTERING

BACKGROUND

Clustering, a fundamental task in data mining and machine learning, is pivotal in uncovering patterns, groups, and structures in unlabeled data. Among various clustering algorithms, density-based methods have gained significant attention due to their ability to identify clusters of arbitrary shapes and sizes. It is with respect to this general technical environment to which aspects of the present disclosure are directed. In addition, although relatively specific problems have been discussed, it should be understood that the examples should not be limited to solving the specific problems identified in the background.

SUMMARY

This summary is provided to introduce a selection of concepts in a simplified form that are further described below in the detailed description section. This summary is not intended to identify key features or essential features of the claimed subject matter, nor is it intended as an aid in determining the scope of the claimed subject matter.

The currently disclosed technology, among other things, provides for large-scale density-based clustering. In examples, a system selects, for a dataset (which may be a sampled dataset that has been sampled at a sampling rate that is less than 100%), a first upper bound value and a first lower bound value of a neighborhood radius parameter of a density-based clustering algorithm. The system identifies, using a modified ternary search algorithm, an optimal neighborhood radius parameter value, based on the first upper bound value and the first lower bound value of the neighborhood radius parameter, and outputs the optimal neighborhood radius parameter value and/or outputs an optimal number of clusters within the dataset corresponding to the optimal neighborhood radius parameter value. The modified ternary search algorithm leverages the near-unimodality of the neighborhood radius parameter. The modified ternary search algorithm further uses selection of a first upper bound value that leverages a characteristic of the neighborhood radius parameter in which the neighborhood radius parameter value increases as the sampling rate decreases. Selection of a first lower bound value that uses ternary search that takes the number of clusters as a parameter instead of the neighborhood radius parameter further enhances the modified ternary search algorithm. In this manner, an optimal neighborhood radius parameter value may be identified in an efficient manner in terms of computational time and computational resources compared with other density-based clustering techniques.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the invention as claimed.

BRIEF DESCRIPTION OF THE DRAWINGS

A further understanding of the nature and advantages of particular embodiments may be realized by reference to the remaining portions of the specification and the drawings, which are incorporated in and constitute a part of this disclosure.

DETAILED DESCRIPTION OF CERTAIN EMBODIMENTS

Density-based clustering refers to an unsupervised machine learning technique that identifies distinctive clusters in data based on use of a cluster or group of data in a data space that corresponds to a contiguous region of higher density separated from other clusters or groups by lower density or sparse regions. Density-based clustering methods often surpass centroid-based counterparts, when addressing data with noise, outliers, or arbitrary data distributions common in real-world problems. This is because noise, outliers, and arbitrary data distributions correspond to lower density or sparse regions that density-based clustering methods exclude from clusters of higher density, whereas centroid-based clustering methods may assign each such noise, outlier, and/or arbitrary data as one of the clusters thus affecting the results. A significant challenge in leveraging the full potential of density-based clustering lies in the parameter tuning process. Parameters such as Epsilon(s), which determines the neighborhood radius for cluster formation in Density-Based Spatial Clustering of Applications with Noise ("DBSCAN") (and its variants), critically influence the clustering outcome. Inappropriate parameter settings can lead to over-segmentation or under-segmentation of data, significantly affecting the quality and interpretability of the results. That is, selecting a neighborhood radius that is too large results in under-segmentation that reduces the quality of the clustering, while selecting a neighborhood radius that is too small results in over-segmentation with an over-abundance of clusters that may interpretation of the results difficult. This is particularly challenging in high-dimensional, large-scale datasets where the intuitive understanding of parameter effects is less apparent.

Figure 3:
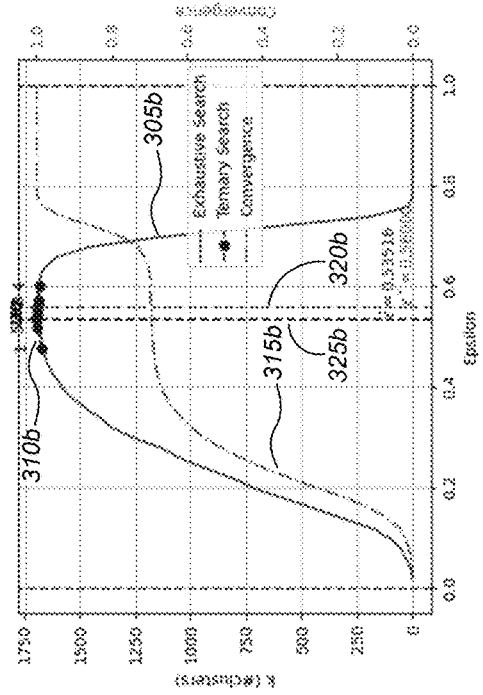
FIGS. 3($a$)-3($d$) depict various example graphs illustrating the use of ternary search versus exhaustive search for searching an optimal neighborhood radius parameter value ($\varepsilon$) for various different given datasets when implementing large-scale density-based clustering functionalities.
Figure 3:
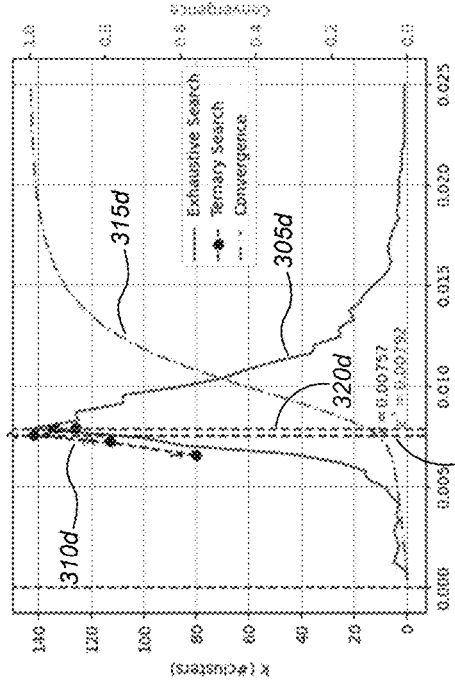
Figure 3:
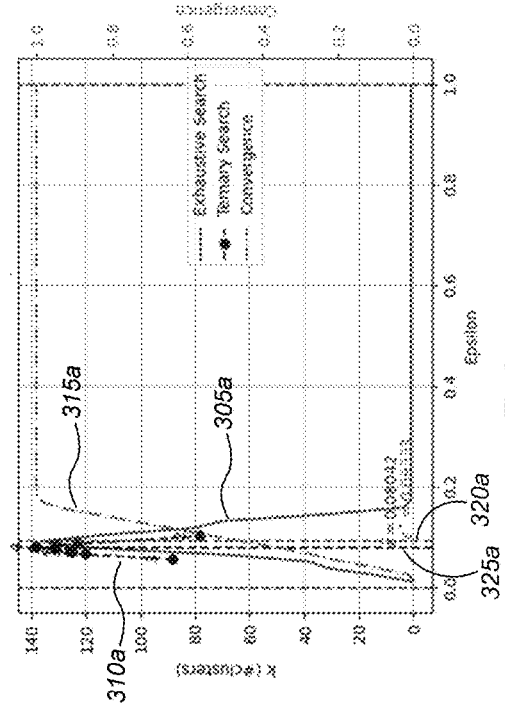
Figure 3:
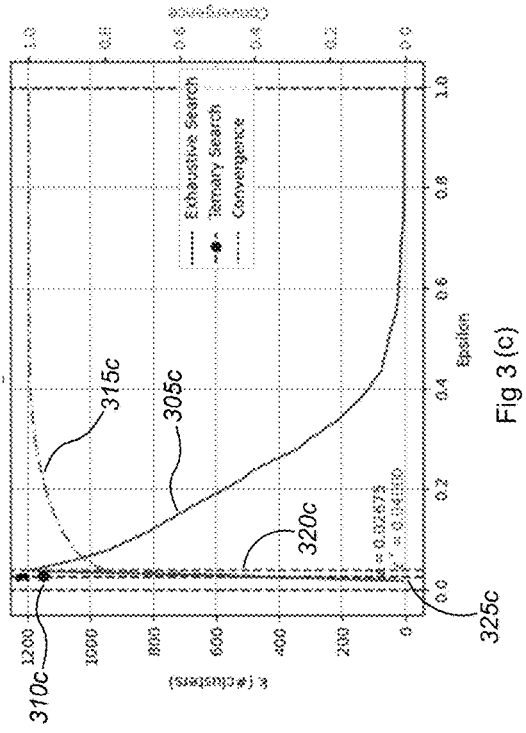

The present technology addresses this challenge by introducing strategies that efficiently tune density-based clustering algorithms to either maximize the number of clusters or guide it towards a target number of clusters, k. The approach described herein is grounded in the observation that the function k(ε), representing the number of clusters formed for a given ε in DBSCAN-like algorithms, exhibits an almost unimodal behavior. The approach leverages this insight to approximate the optimal ε value that yields a desired number of clusters, effectively solving a crucial problem in density-based clustering. To demonstrate the efficacy and versatility of this approach, the techniques described herein are applied to several high-dimensional, large-scale classification datasets (e.g., as shown in FIG. 3). The techniques herein consistently achieve the target number of clusters, but it also retains, or in some cases, enhances the quality of the clustering results. This is particularly noteworthy in datasets where traditional parameter selection methods struggle due to the scale and complexity of the data.

Various modifications and additions can be made to the embodiments discussed herein without departing from the scope of the disclosed techniques. For example, while the embodiments described above refer to particular features, the scope of the disclosed techniques also includes embodiments having different combinations of features and embodiments that do not include all of the above-described features.

Turning to the embodiments as illustrated by the drawings, FIGS. 1-5 illustrate some of the features of methods, systems, and apparatuses for implementing object clustering functionalities, and, more particularly, to methods, systems, and apparatuses for implementing large-scale density-based clustering functionalities, as referred to above. The methods, systems, and apparatuses illustrated by FIGS. 1-5 refer to examples of different embodiments that include various components and steps, which can be considered alternatives or which can be used in conjunction with one another in the various embodiments. The description of the illustrated methods, systems, and apparatuses shown in FIGS. 1-5 is provided for purposes of illustration and should not be considered to limit the scope of the different embodiments.

Figure 1:
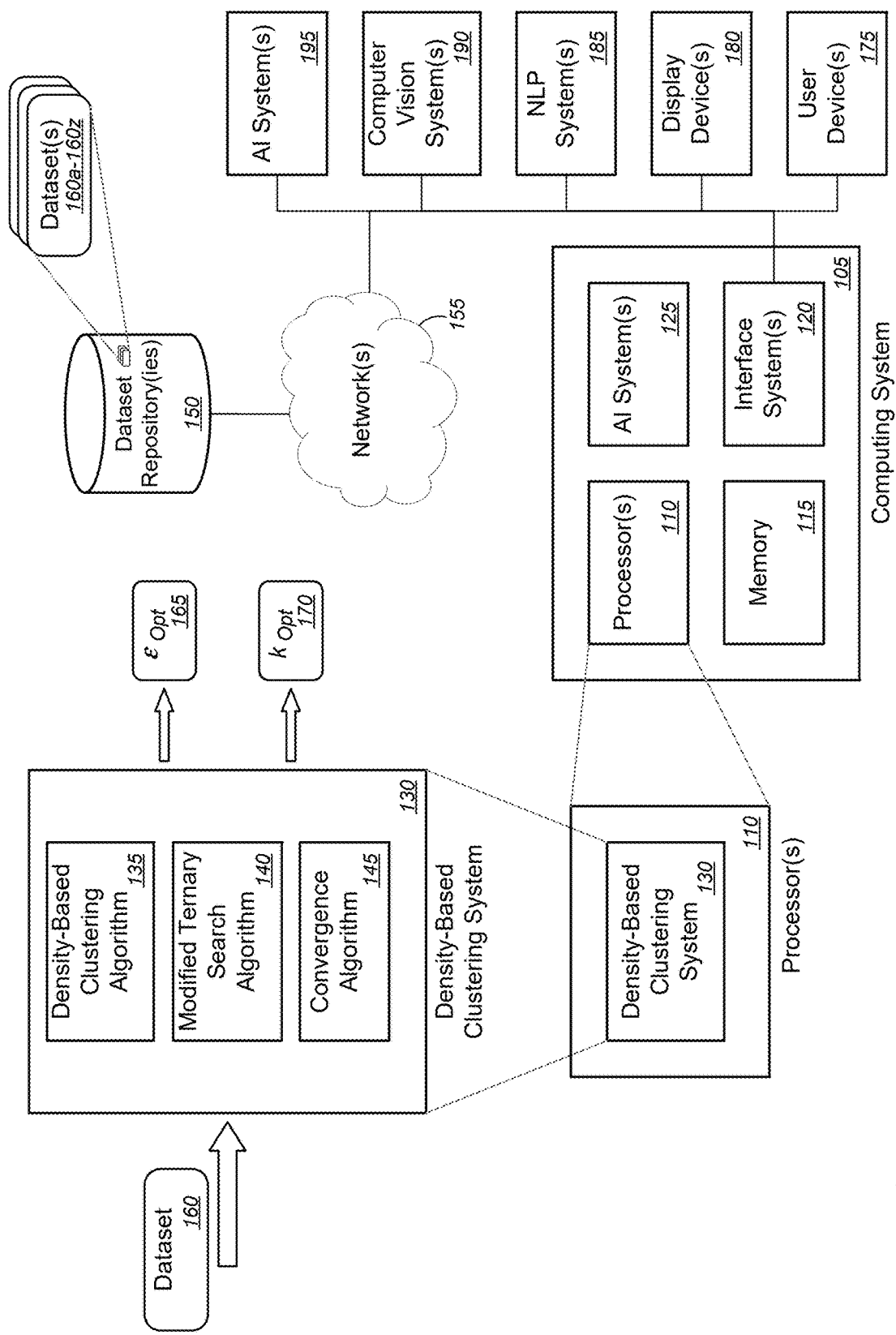
FIG. 1 depicts an example system for implementing large-scale density-based clustering functionalities.

FIG. 1 depicts an example system 100 for implementing large-scale density-based clustering functionalities. System 100 includes a computing system 105, which includes a processor(s) 110, a memory 115, an interface system 120, and an artificial intelligence ("AI") system(s) 125. In some examples, the processor(s) 110 includes a density-based clustering system 130, which utilizes a density-based clustering algorithm 135, a modified ternary search algorithm 140, and a convergence algorithm 145. These algorithms are described in detail below with respect to FIGS. 2A-2B and 4A-4C. In some cases, the density-based clustering algorithm 135 includes a DBSCAN algorithm or an Ordering Points To Identify Clustering Structure ("OPTICS") algorithm. In some examples, the DBSCAN algorithm includes one of a Varied DBSCAN ("VDBSCAN") algorithm, a Hierarchical DBSCAN ("HDBSCAN") algorithm, or a Stratified Sampling DBSCAN ("SS-DBSCAN") algorithm.

System 100 further includes a dataset repository(ies) 150 that is accessible by computing system 105 via network(s) 155 and interface system(s) 120. In some examples, the interface system(s) 120 includes one or more of a web portal interface, an application programming interface ("API"), a web browser interface, a file share interface, a file transfer protocol ("FTP") interface, or a (wired or wireless) network connection to a network access point or gateway. The AI system(s) 125 is a system for performing AI functions local to the computing system 105, and may be used to perform some functions of the density-based clustering system 130, as described below. The network(s) 155 may each include at least one of a distributed computing network, such as the Internet, a private network, a commercial network, or a cloud network.

The dataset repository(ies) 150 stores a plurality of dataset(s) 160a-160z (collectively, "dataset(s) 160"). In examples, at least one of the datasets 160a-160z includes embeddings that are numerical representations of images, videos, audio signal, words, code, data signals, or electromagnetic spectrum signals. In some examples, each dataset 160 corresponds to one of a dataset of images of objects, a dataset of video frames of objects, a dataset of audio signal values, a dataset of text data, a dataset of natural language ("NL") sentences, a dataset of programming code, a dataset of data signal values, or a dataset of electromagnetic spectrum signal values. In some cases, the objects include at least one of people, animals, plants, insects, electronic devices, man-made tools, man-made objects, vehicles, buildings, other man-made structures, or landmarks. In some instances, the audio signal values correspond to at least one of human speech, music, nature sounds, or audio signals converted from one of electronic signals or electromagnetic spectrum signals.

In operation, the computing system 105, the processor(s) 110, the AI system(s) 125, and/or the density-based clustering system 130 may perform methods for implementing large-scale density-based clustering functionalities. In examples, given a dataset 160 (either received or accessed from a data storage system, such as dataset repository(ies) 150, via network(s) 155 and interface system(s) 120), the density-based clustering system 130 uses density-based clustering algorithm 135, modified ternary search algorithm 140, and convergence algorithm 145 to output an optimal neighborhood radius parameter value ($\varepsilon_{Opt}$) 165 and/or an optimal number of clusters ($k_{Opt}$) 170 that is based on the optimal neighborhood radius parameter value ($\varepsilon_{Opt}$) 165, as described in detail below with respect to FIGS. 2A-2C and 4A-4C. In some cases, AI system(s) 125 may be used to perform operations of the density-based clustering system 130, by using machine learning ("ML") models to perform a search of the optimal neighborhood radius parameter value ($\varepsilon_{Opt}$) 165 and/or the optimal number of clusters ($k_{Opt}$) 170 using the density-based clustering algorithm 135, the modified ternary search algorithm 140, and/or the convergence algorithm 145. In examples, the ML models include convolutional neural networks ("CNNs"), recurrent neural networks ("RNNs"), deep neural networks ("DNNs"), transformers, and/or long short-term memory networks ("LSTMs"). The optimal neighborhood radius parameter value ($\varepsilon_{Opt}$) 165 and/or the optimal number of clusters ($k_{Opt}$) 170 may then be output via interface system(s) 120 to one or more of a user device(s) 175 for display and/or storage of these values, a display device(s) 180 for display of these values, a natural language processing ("NLP") system 185 for use of these values in clustering NL words for training of or inferencing by a language model ("LM"), a computer vision system(s) 190 for use of these values in clustering objects in images or videos for training of or inferencing by a computer vision model, and/or AI system(s) 195 for use of these values for performing other AI or ML tasks based on ML models. Examples of text clustering models or algorithms include K-means models, Hierarchical Clustering models, DBSCAN models, Latent Semantic Analysis ("LSA") models, and Latent Dirichlet Allocation ("LDA") models. Examples of computer vision models or algorithms include You Only Look Once ("YOLO" or "YOLOX") models, Single Shot Detector ("SSD") models, Fast(er) Region-based Convolutional Neural Network ("R-CNN") models, and PoseNet models. Examples of "other" ML models include, for ASR and other audio recognition models, Perceptual Linear Prediction ("PLP") models, Viterbi models, and Weighted Finite-State Transducers ("WFST") models. In examples, the model is trained using the type of information the model is trained to detect or evaluate. For instance, a model trained to detect faces in images is trained using images that include (1) faces and (2) labels that point out the faces. In some examples, the labeled images can include positive examples (e.g., faces and corresponding labels) and/or negative examples (e.g., this "object" in the image looks like a face but the label indicates that it is not a face). In examples, the expected input for such a model is an image or feature data (e.g., a feature vector) representing an image. In some examples, the expected output is a "determination" (e.g., a "yes/no," a probability, or coordinates of the face) indicating whether the received image includes a face.

In examples, the LM includes a small language model ("SLM"), a large language model ("LLM"), or other language model. As used herein, an LLM refers to a machine learning model that is trained and fine-tuned on a large corpus of media (e.g., text, audio, video, or software code), that can be used for text generation by taking an input text and repeatedly predicting the next token or word, and that can be accessed and used through an application programming interface ("API") or a platform. An SLM is similar to an LLM, except that it has fewer parameters and requires less data and time to be trained. An SLM and an LLM each performs a variety of tasks, including generating and classifying media, answering user requests and questions in a conversational manner, and translating text from one language to another. Examples of LLMs (or more generally language models ("LMs")) include Bidirectional Encoder Representations from Transformers ("BERT"), Word2Vec, Global and Vectors ("GloVe"), Embeddings from Language Models ("ELMo"), XLNet, Generative Pre-trained Transformer ("GPT")-3 or GPT-4, Large Language Model Meta AI ("LLaMA") 2, or BigScience Large Open-science Open-access Multilingual Language Model (BLOOM). Examples of SLMs include Llama 2 7B, Phi-2, Orca, Stable Beluga 7B, X Gen, Qwen, Alpaca 7B, MPT, Falcon 7B, or Zephyr. In some examples, the ML models used by AI system(s) 195 include CNNs, RNNs, DNNs, transformers, and/or LSTMs. In examples, other ML models include multimodal models that are capable of either one or more of text, image, audio, or video as both input and output, or using one or a first combination of text, image, audio, and/or video as input and using another or a second combination of text, image, audio, and/or video as output. Examples of multimodal models include GPT-4 (which can use both text and image as inputs), LLAMA 2 (which allows for image and video inputs), or Gemini (which was designed to process text, images, audio, video, and computer code). In some examples, the computer vision model includes object detection models such as a YOLO or YOLOX CNN-based model, a R-CNNs-based model, a Scale-Invariant Feature Transform ("SIFT")-based model, or Histogram of Oriented Gradients ("HOG")-based model.

Figure 2A:
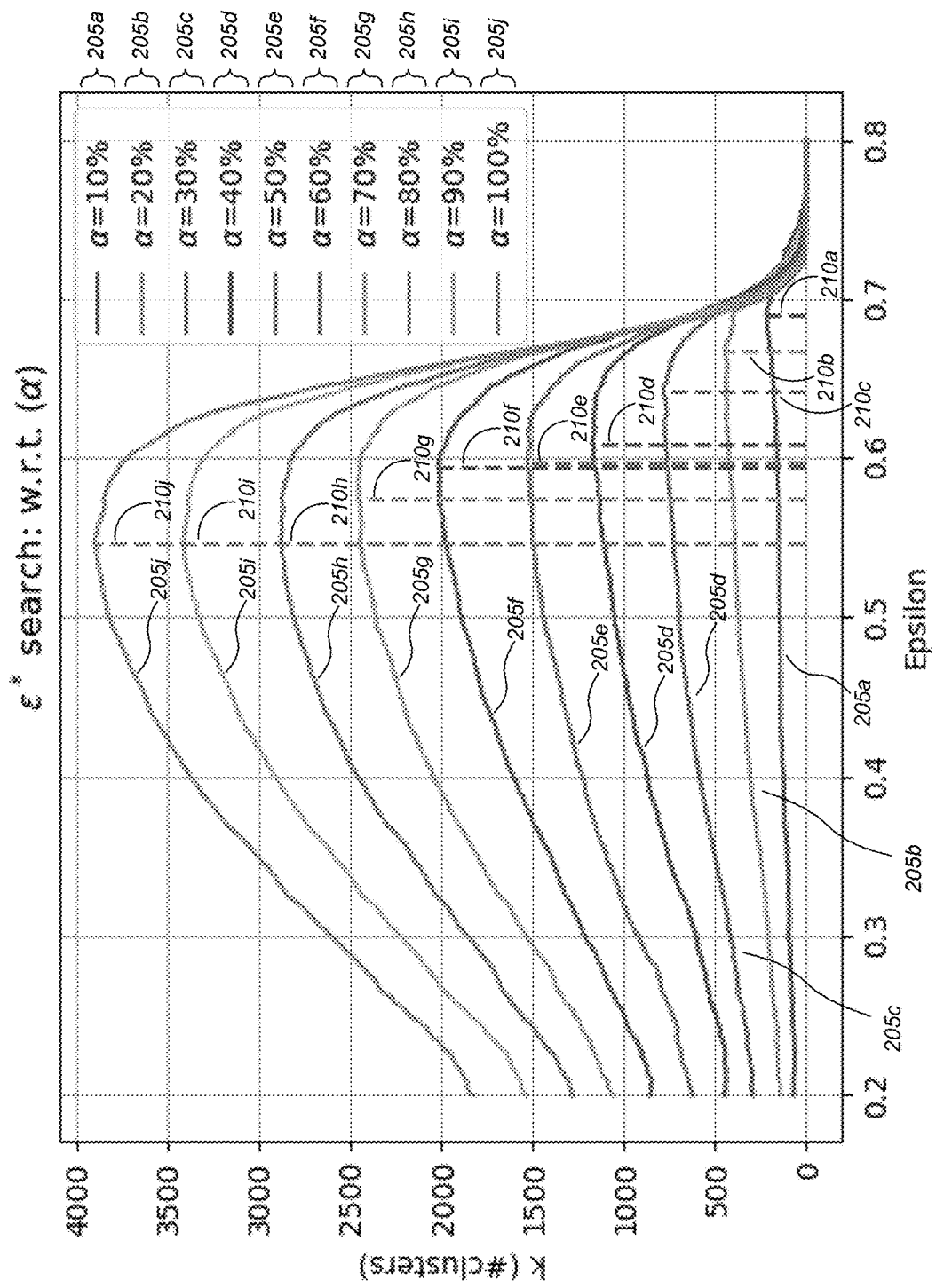
FIG. 2A depicts an example graph illustrating exhaustive search results for searching an optimal neighborhood radius parameter value ($\varepsilon$) with respect to various different sampling rates ($\alpha$) for a given dataset when implementing large-scale density-based clustering functionalities.
Figure 2B:
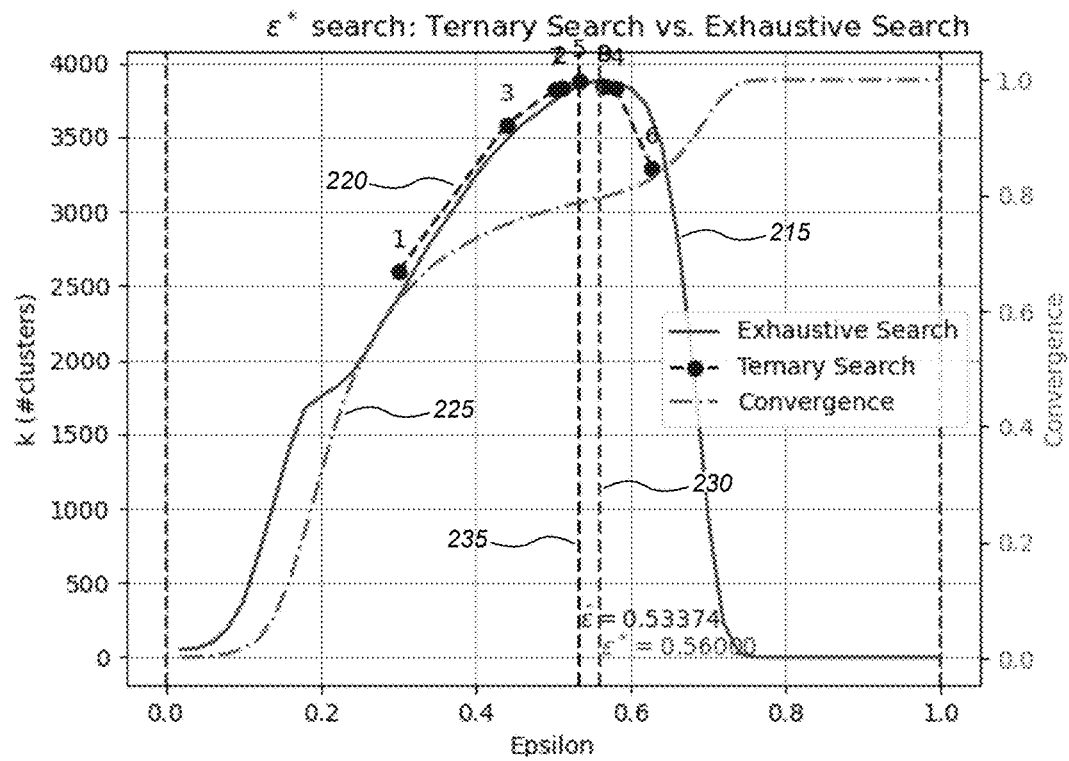
FIG. 2B depicts an example graph illustrating the use of ternary search versus exhaustive search for searching an optimal neighborhood radius parameter value ($\varepsilon$) for a given dataset when implementing large-scale density-based clustering functionalities.
Figure 2C:
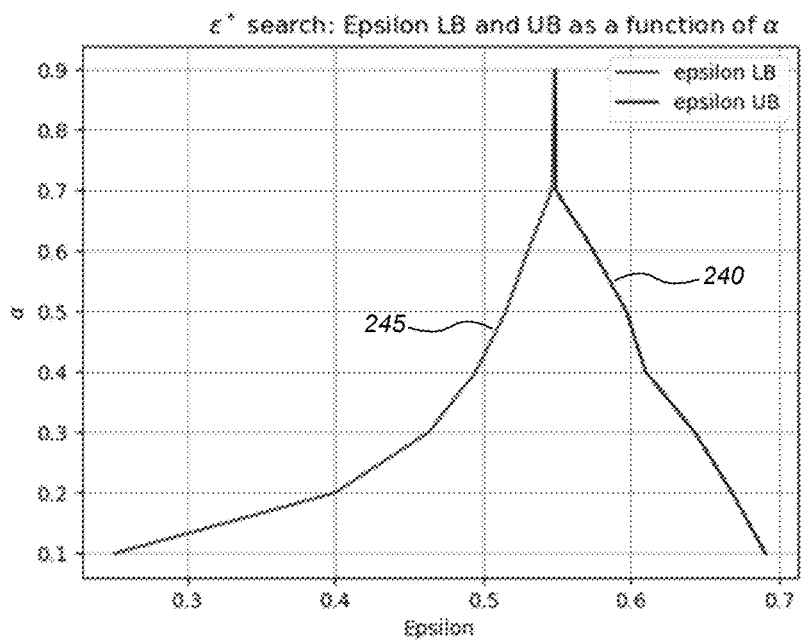
FIG. 2C depicts an example graph illustrating the use of upper bound values and lower bound values of a neighborhood radius parameter ($\varepsilon$) that are calculated or determined based on a sampling rate ($\alpha$) for a given dataset when implementing large-scale density-based clustering functionalities.

In examples, the large-scale density-based clustering functionalities are as described in detail below with respect to FIGS. 2A-4C. For example, example graphs 200A-200C illustrate (A) a relationship between an optimal neighborhood radius parameter value ($\varepsilon$) and various different sampling rates ($\alpha$) for a given dataset, (B) the use of ternary search versus exhaustive search for searching an optimal neighborhood radius parameter value ($\varepsilon$) for a given dataset, and (C) the use of upper bound values and lower bound values of a neighborhood radius parameter ($\varepsilon$) that are calculated or determined based on a sampling rate ($\alpha$) for a given dataset, respectively, as shown in FIGS. 2A-2C. Example graphs 300, as shown in FIGS. 3(a)-3(d) illustrate the use of ternary search versus exhaustive search for searching an optimal neighborhood radius parameter value ($\varepsilon$) for various different given datasets. Example graphs 200A-200C of FIGS. 2A-2C, example graphs 300 of FIGS. 3(a)-3(d), and example methods 400A and 400B as described below with respect to FIGS. 4A-4C may be applied with respect to the operations of system 100 of FIG. 1.

FIG. 2A depicts an example graph 200A illustrating exhaustive search results for searching an optimal neighborhood radius parameter value ($\varepsilon$) with respect to various different sampling rates ($\alpha$) for a given dataset when implementing large-scale density-based clustering functionalities. FIG. 2B depicts an example graph 200B illustrating the use of ternary search versus exhaustive search for searching an optimal neighborhood radius parameter value ($\varepsilon$) for a given dataset when implementing large-scale density-based clustering functionalities. FIG. 2C depicts an example graph 200C illustrating the use of upper bound values and lower bound values of a neighborhood radius parameter ($\varepsilon$) that are calculated or determined based on a sampling rate ($\alpha$) for a given dataset when implementing large-scale density-based clustering functionalities.

The present technology is directed to efficient tuning of density-based clustering algorithms either to maximize the number of clusters or to guide the density-based clustering algorithms towards a target number of clusters. The approach described herein is grounded in the observation that the function $k(\varepsilon)$, representing the number of clusters formed for a given $\varepsilon$ in DBSCAN-like algorithms, exhibits an almost unimodal behavior. Unimodality, in the context of a function, refers to the property of having a single mode or peak. This implies that the function is monotonically non-decreasing to a certain point (e.g., the mode or peak), and from that point monotonically non-increasing. In a broader sense, a unimodal function represents a distribution or a set of values characterized by a single peak. The function $k(\varepsilon)$, representing the number of clusters identified by a density-based clustering algorithm for a given $\varepsilon$, is critical in understanding the behavior of these algorithms. Given a fixed MinPts value, a near-unimodality property of $k(\varepsilon)$ is observed. This property results from the following characteristics of the algorithm: (1) low values of $\varepsilon$ flag more examples as noise and so less clusters are formed (note that when $k(\varepsilon)=0$ all points are considered noise), while (2) high values of $\varepsilon$ combine clusters together and reduce the number of clusters back until $k=1$. $k(\varepsilon)$ is not strictly unimodal especially in diverse metric spaces. Even if not strictly unimodal, the algorithm exhibits a general increase region followed by a general decrease region creating a single global peak (as shown, e.g., in FIG. 2A). There are some cases where unimodality does not hold, e.g., due to noise and cluster formation. Still, clustering datasets form a near-unimodal function in practice where a single peak has multiple local maxima peaks rather than a smooth single peak and where the local maxima peaks could be considered as noise. Herein, the clustering algorithms exhibit either unimodal behavior (with a smooth single peak) or near-unimodal behavior (with a single peak having multiple local maxima peaks), as described above.

In particular, in the case of real-life neural embeddings being used, real-life applications involving neural embeddings of images and text data exhibit a near-unimodal behavior of $k(\varepsilon)$. This observation holds when considering a fixed MinPts in a density-based method with noise, such as DBSCAN. This near-unimodality in neural embeddings suggests a more predictable and stable behavior of $k(\varepsilon)$ when applied on practical, real-world datasets. This property can be leveraged to enhance the efficiency and accuracy of density-based clustering methods in handling complex, high-dimensional data commonly encountered in modern machine learning and data mining applications.

For example, FIG. 2A illustrates the DBSCAN $k(\varepsilon)$ function over different samples of a video-based facial embeddings dataset (N=45,000). A single maximum is visible in all samples, referred to herein as a maximum value $\varepsilon^*$, where dashed lines 210a-210j correspond to $\varepsilon^*$ for corresponding sampling rates $\alpha$, while the solid curves 205a-205j each corresponds to an exhaustive search for $\varepsilon$ by performing DBSCAN at each minor increment of $\varepsilon$ to calculate $k(\varepsilon)$ for each corresponding sampling rate $\alpha$, where a is 10, 20, 30, 40, 50, 60, 70, 80, 90, and 100%. A few patterns can be observed in this figure. First, the function $k(\varepsilon)$ is near unimodal where low values of $\varepsilon$ yield less clusters with low coverage while high values of $\varepsilon$ also yield less clusters due to over-clustering. Second, while the unimodality pattern significance is visible, some noise appears throughout. Third, as the sampling ratio or rate $\alpha$ increases (e.g., as more data is sampled), the data becomes more dense and the $\varepsilon^*$, which maximizes $k(\varepsilon)$, converges towards a lower value of $\varepsilon$.

Based on these observations of the near-unimodality pattern, a modified ternary search algorithm (corresponding to modified ternary search algorithm 140 of FIG. 1) is provided for efficiently finding $\varepsilon^*$ that maximizes $k(\varepsilon)$, and for leveraging near-unimodality as a variant of the ternary search algorithm that takes k as a parameter instead of $\varepsilon$. Where a traditional ternary search algorithm finds a minimum or a maximum of a unimodal function (e.g., a single peak, either positive or negative), by using an initial upper bound value and an initial lower bound value that are chosen, either by default or randomly, such that a likely location of the single peak lies between the initial upper bound value and the initial lower bound value. In practice, a very large initial lower bound value and a very large initial upper bound value are chosen to ensure that the single peak lies therebetween. By contrast, the modified ternary search algorithm utilizes the techniques described herein to select, based on characteristics of the unimodal characteristics of the neighborhood radius parameter value at different sampling rates and different dimensions, initial upper bound and lower bound values that are much closer to the likely location of the single peak without having to choose, by default or randomly, very large initial upper and lower bound values. In this manner, convergence to the location of the single peak is greatly improved. To search for an optimal $\varepsilon$, the process begins with estimating an upper bound UB$\varepsilon$ and a lower-bound LB$\varepsilon$ using a sampling rate $\alpha$ of 20% of the data in the dataset. The modified ternary search algorithm uses these upper and lower bound values to identify convergence to a noisy plateau peak or deterministically using a counter (e.g., "iterCap"). The process subsequently attempts to interpolate the final LB$\varepsilon$ and UB$\varepsilon$, and returns the best solution, in terms of imposing the largest number of clusters (k) per fixed MinPts. FIG. 2B illustrates convergence compared with linear exhaustive search. While exhaustive search is excessively expensive in terms of computational time and computational resources, and therefore impractical, it makes a good theoretical demonstration for the underlying empirical $k(\varepsilon)$ function.

The unimodality property forms a single mode while the $k(\varepsilon)$ function begins with zero clusters, gradually grows to $k(\varepsilon^*)$, and then decreases to a single cluster as $\varepsilon$ approaches infinity. The modified ternary search algorithm is configured to adapt accordingly. In each iteration, the modified ternary search algorithm splits the $\varepsilon$ search range into three equal size intervals. The maximum value $\varepsilon^*$ is not on the left interval if number of clusters k equals 0 as $\varepsilon$ is too small to form even a single core point. When the number of clusters k on the right interval equals 1, $\varepsilon^*$ is assumed to not be on the right interval as an over-clustered solution has already formed in that case. The center interval, however, is irrelevant when the number of clusters k on the right interval and the number of clusters k on the left interval both equal 0 or 1, except in the rare case that the number clusters k on the left interval by chance corresponds to 1 cluster at a $\varepsilon$ that is too small (this rare exception may be easily identified, however, using a coverage metric or the like). When the number of clusters k on the right interval and the number of clusters k on the left interval are both greater than 1, the side with the smaller k is omitted or ignored. The latter case is the frequent mode due to the initialization methods with lower and upper bounds described below. Referring to FIG. 2B, the results of the exhaustive search 215 are compared with the modified ternary search algorithm results 220 (referred to in graph 200B as "Ternary Search"). Points on the Ternary Search indicate a counter (e.g., "iterCap" counter). Convergence results 225 indicate convergence of the $\varepsilon$ values. Vertical line 230 corresponds to $\varepsilon^*$ for the exhaustive search 215 (in this case, with a value of 0.56000) and vertical line 235 corresponds to $\hat{\varepsilon}$ for the Ternary Search (in this case, with a value of 0.53374), where $\hat{\varepsilon}$ is the optimal $\varepsilon$ for the Ternary Search.

The initialization methods with lower and upper bounds, as mentioned above, focus the Ternary Search to a smaller section of the possible intervals for $\varepsilon$, instead of starting with lower and upper bounds of 0 and 1 (for instance), thereby improving the efficiency of the Ternary Search. For finding an upper bound value, the modified ternary search algorithm leverages the property as described above with respect to FIG. 2A in which $\varepsilon^*$ increases as sampling rate $\alpha$ decreases. For example, using a sampling rate of $\alpha=20\%$, the upper bound value is initialized using a very large number like 1 in the case of Cosine metrics and a sum of the ranges over all sampled examples for unbounded metrics. For the unbounded case, in some examples, the sum of the ranges over all sampled examples is calculated by $\Sigma_{d \in D} \max(x_d) - \min(x_d)$, where d denotes a dimensional variable for high-dimensional data, D denotes a depth of all dimensions or a maximum number of dimensions of the high-dimensional data, and $x_d$ denotes embeddings corresponding to the dimensional variable. While any distance metric is non-negative, bounding the search space from below helps optimizing the runtime. The lower bound strategy is a pivot to the upper bound approach as $\lceil \alpha^* D \rceil$ dimensions are sampled and the feature vector is narrowed down while leaving the number of examples (N) fixed. Examples, as used herein, refer to articles that can be represented by vectors, and the articles include images of objects, videos of objects, audio signals, words, codes, data signals, or electromagnetic spectrum signals. In examples, objects include people, faces, animals, plants, insects, electronic devices, man-made tools, man-made objects, vehicles, buildings, other man-made structures, and/or landmarks. The modified ternary search algorithm is applied on the sampled columns and the lower bound is considered to be $\varepsilon_\alpha^*$. Herein, the columns refer to embeddings dimensions 1 to D (e.g., 1 to 256). That is, as the density of data points is left unchanged, sub-sampling of features (e.g., sampling at 20%) turns $\varepsilon_\alpha^*$ to a solid lower bound value. FIG. 2C illustrates the convergence of the search space given various $\alpha$ values, where the line curve 240 corresponds to the upper bound value as a function of $\alpha$, while the line curve 245 corresponds to the lower bound value as a function of $\alpha$.

FIGS. 3(a)-3(d) depict various example graphs 300 illustrating the use of ternary search versus exhaustive search for searching an optimal neighborhood radius parameter value ($\varepsilon$) for various different given datasets when implementing large-scale density-based clustering functionalities. The datasets used include (a) the Reuters-21578 Text Categorization Collection (corresponding to FIG. 3(a)), (b) the Labeled Faces in the Wild ("LFW") dataset (corresponding to FIG. 3(b)), (c) the ImageNet1K dataset (corresponding to FIG. 3(c)), and (d) the CIFAR100 dataset (corresponding to FIG. 3(d)). The Reuters-21578 Text Categorization Collection is a dataset containing 21,578 published Reuters Newswire documents in 1987 as part of the University of California, Irvine ("UCI") Knowledge, Discovery, and Data Mining Tools ("KDD") archive. It was labeled with 135 different topics out of which 57 appear in 20 documents or more. This dataset, the union of the training, and test splits were embedded using OpenAI's 'Embedding-ADA-002' model and clustered using the modified ternary search algorithm. LFW is a database of face photographs designed for studying the problem of unconstrained face recognition. The data set contains over 13,000 images of faces collected from the web. ImageNet1k is a State-of-the-art ("SoTA") model for ImageNet1k classification. Hiera hierarchical transformer features for clustering were used. The long-tail pattern was found using Contrastive Language-Image Pre-training ("CLIP") features, but in both cases a unimodal function of k($\varepsilon$) was detected. CIFAR100 shares domain characteristics with ImageNet and demonstrates the near-unimodality property using the CLIP features and Hiera features.

Referring to FIGS. 3(a)-3(d), the results of the exhaustive search 305a-305d, respectively, is compared with the corresponding modified ternary search algorithm results 310a-310d (referred to in graph 300 as "Ternary Search"). Corresponding convergence results 315a-315d indicate convergence of the $\varepsilon$ values. Vertical lines 320a-320d correspond to $\varepsilon^*$ for each respective exhaustive search 305a-305d (in this case, with a value of 0.09333 for FIG. 3(a), a value of 0.56000 for FIG. 3(b), a value of 0.04000 for FIG. 3(c), and a value of 0.00792 for FIG. 3(d)) and vertical lines 325a-325d correspond to $\hat{\varepsilon}$ for each respective Ternary Search (in this case, with a value of 0.08042 for FIG. 3(a), a value of 0.53516 for FIG. 3(b), a value of 0.02675 for FIG. 3(c), and a value of 0.00757 for FIG. 3(d)), where $\hat{\varepsilon}$ is the optimal $\varepsilon$ for the Ternary Search. As shown in FIGS. 3(a)-3(d), the modified ternary search algorithm or Ternary Search achieves optimal neighborhood radius parameter values $\hat{\varepsilon}$ that are close to the $\varepsilon$ values using the exhaustive search, and can achieve such results with fewer computational resources and in less time compared with the exhaustive search approach.

Figure 4A:
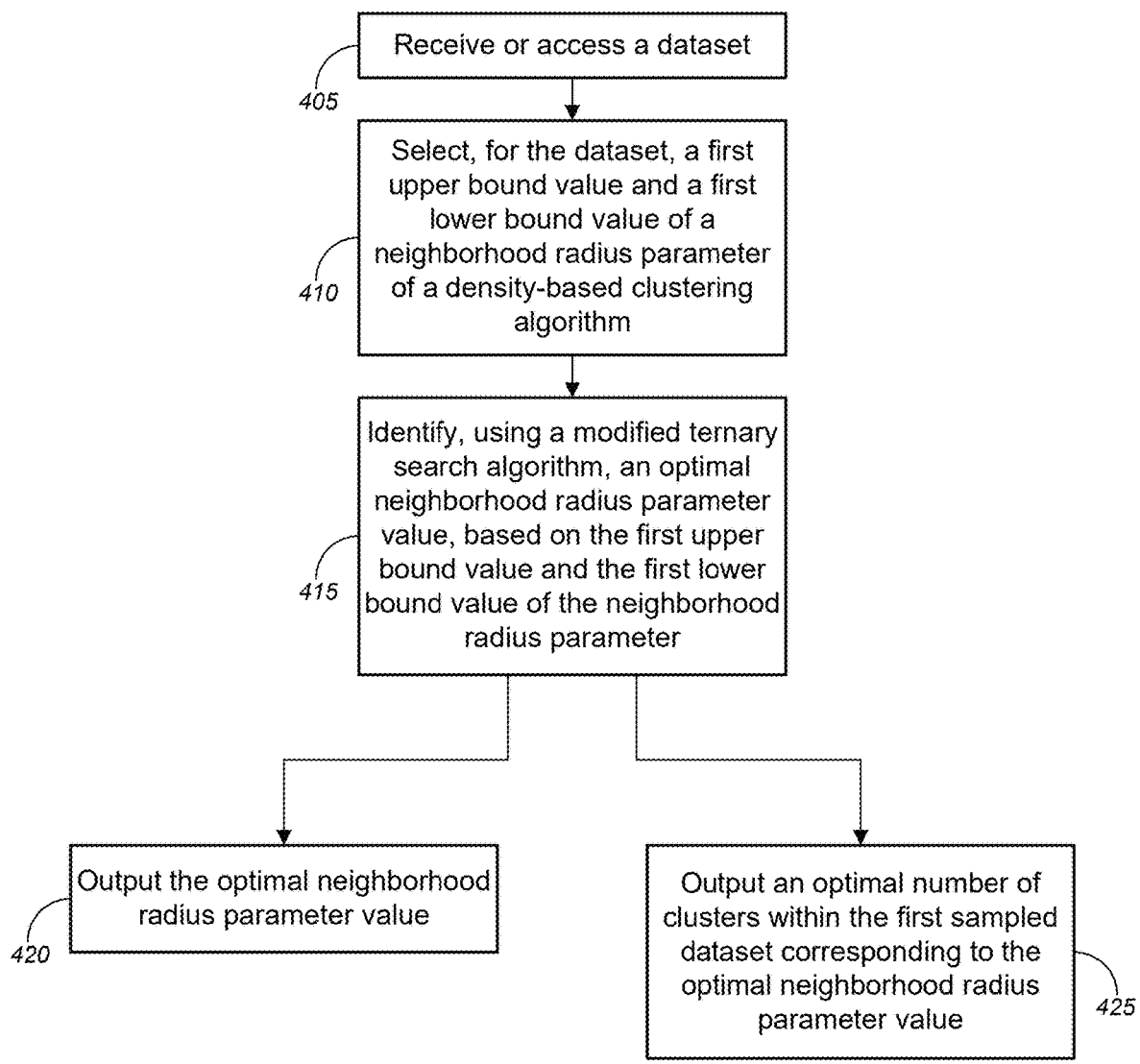
FIGS. 4A-4C depict various example methods for implementing large-scale density-based clustering functionalities.
Figure 4B:
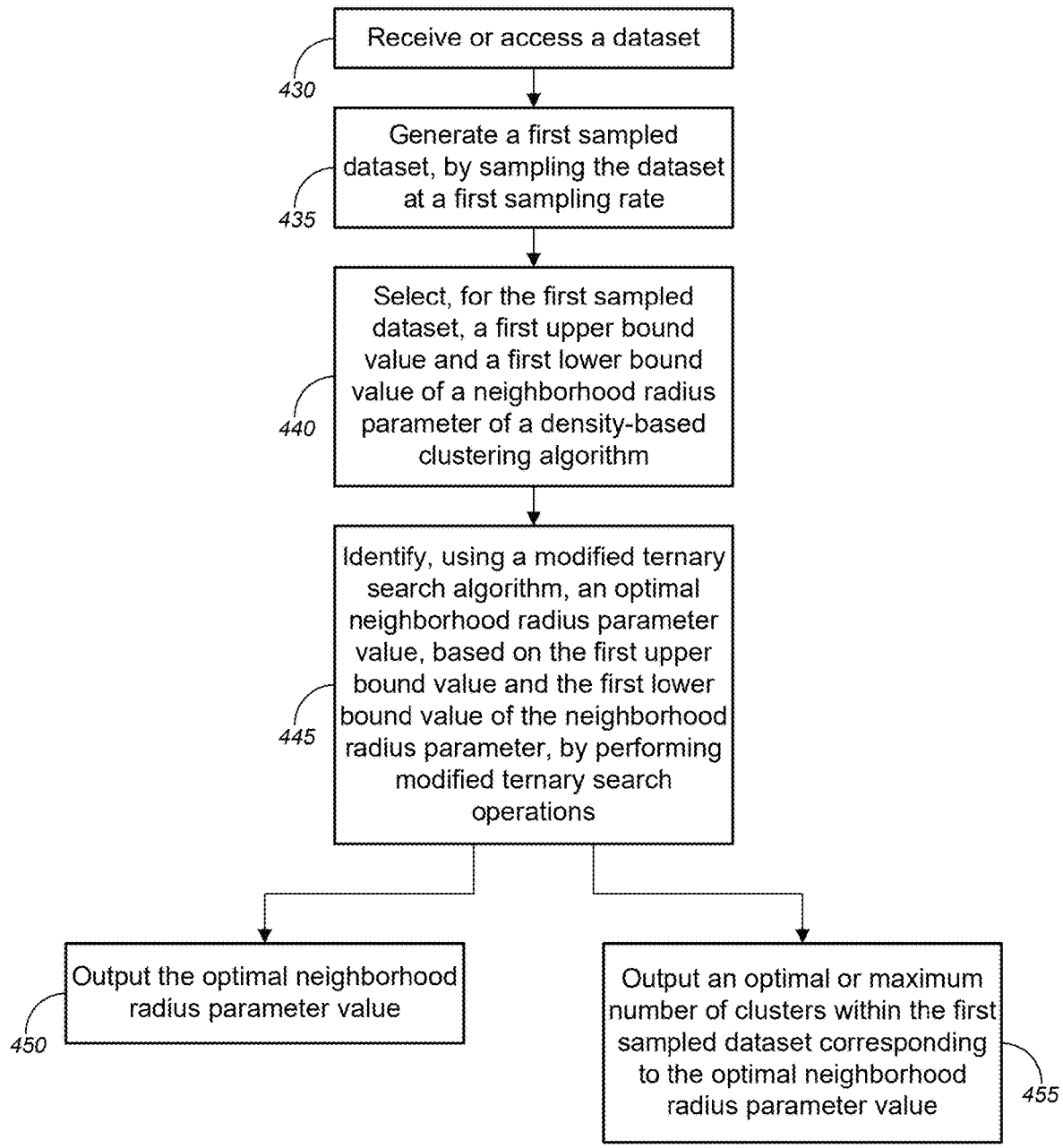
Figure 4C:
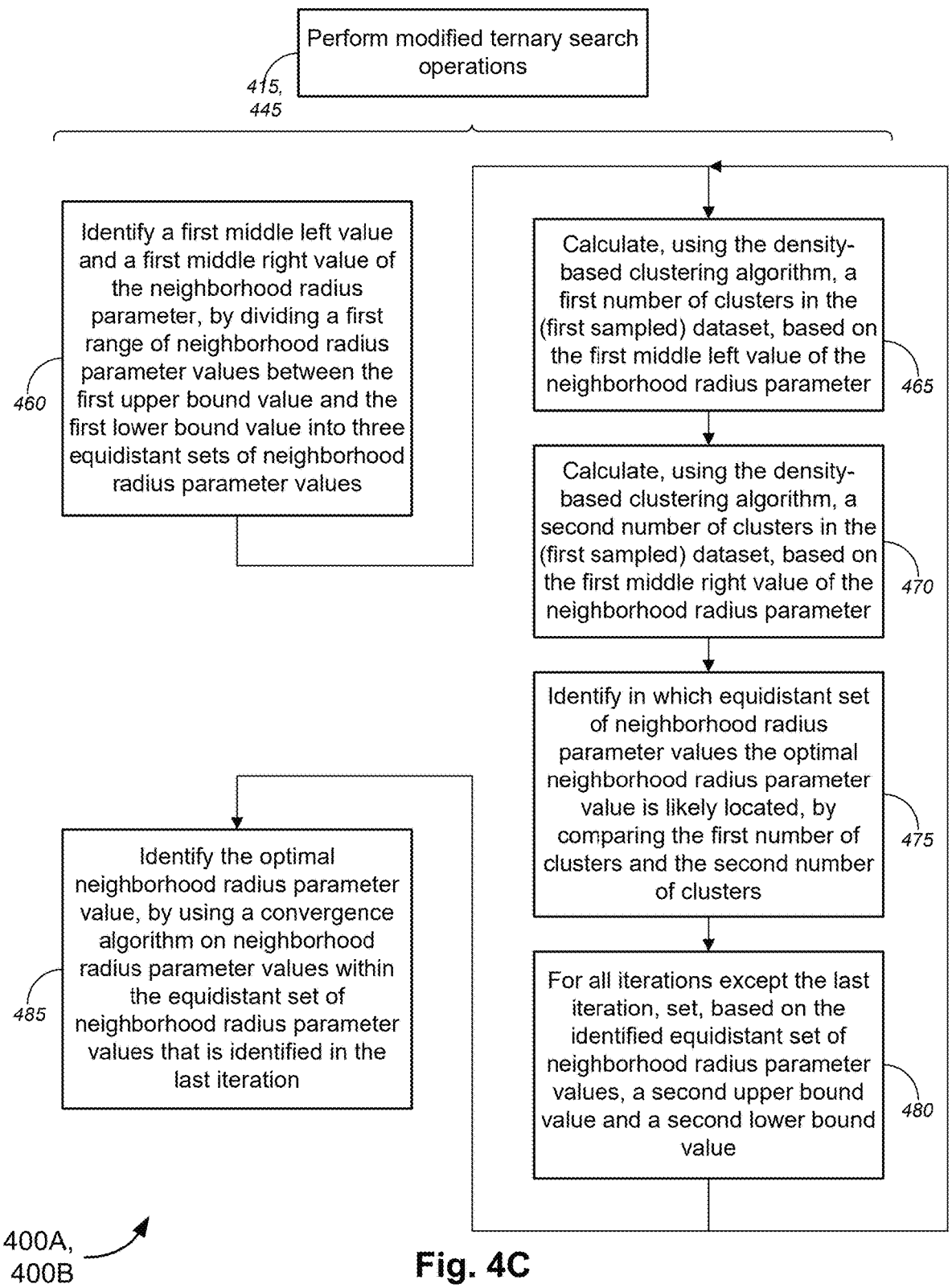

FIGS. 4A-4C depict various example methods 400A and 400B for implementing large-scale density-based clustering functionalities. Methods 400A and 400B represent similar, but alternative approaches for searching for an optimal neighborhood radius parameter value when implementing large-scale density-based clustering functionalities. In particular, method 400A of FIGS. 4A and 4C is directed to identifying and outputting an optimal neighborhood radius parameter value for a fully sampled dataset and/or an optimal number of clusters for the fully sampled dataset. Method 400B of FIGS. 4B and 4C, on the other hand, is directed to identifying and outputting an optimal neighborhood radius parameter value for a sampled dataset and/or an optimal or maximum number of clusters for the sampled dataset, where the sampled dataset corresponds to an original (or fully sampled) dataset having been sampled at a sampling rate that is less than 100%. As described above, the higher the sampling rate, the more accurate the calculation for the optimal neighborhood radius parameter value, but more time and computational resources are required with higher sampling rates. In either method, in the process of identifying the optimal neighborhood radius parameter value, a density-based clustering algorithm (e.g., DBSCAN) is used, at various instances, to label points in a neighborhood of each point in the (sampled) dataset to identify core points having a set minimum number of neighbors (e.g., "MinPts" or "MinPoints" used in DBSCAN), where the neighborhood is defined by a neighborhood radius parameter (e.g., "s" used in DBSCAN). The core points are connected to form a cluster and each non-core-point is assigned to the cluster or assigned (or labelled) as noise. The number of clusters (e.g., "k" used in DBSCAN) are subsequently counted. In the processes of methods 400A and 400B, various different neighborhood radius parameter values are used throughout the process to pinpoint or focus on the optimal neighborhood radius parameter value for a given dataset. Herein, the optimal or maximum number of clusters and the corresponding optimal neighborhood radius parameter value is in relation to the sample dataset, where a dataset that has been sampled at different sampling rates may have different optimal neighborhood radius parameter values corresponding to those sampling rates.

With reference to FIG. 4A, method 400A, at operation 405, includes a density-based clustering system (e.g., density-based clustering system 130 of FIG. 1) receiving or accessing a dataset (e.g., dataset 160 or one (other) of datasets 160a-160z of FIG. 1). In examples, as described above, the dataset includes embeddings that are numerical representations of images, videos, audio signal, words, code, data signals, or electromagnetic spectrum signals. In some examples, the dataset corresponds to one of a dataset of images of objects, a dataset of video frames of objects, a dataset of audio signal values, a dataset of text data, a dataset of NL sentences, a dataset of programming code, a dataset of data signal values, or a dataset of electromagnetic spectrum signal values. In some cases, the objects include at least one of people, animals, plants, insects, electronic devices, man-made tools, man-made objects, vehicles, buildings, other man-made structures, or landmarks. In some instances, the audio signal values correspond to at least one of human speech, music, nature sounds, or audio signals converted from one of electronic signals or electromagnetic spectrum signals.

At operation 410, the density-based clustering system selects, for the dataset, a first upper bound value and a first lower bound value of a neighborhood radius parameter ($\varepsilon$) of a density-based clustering algorithm (e.g., density-based clustering algorithm 135 of FIG. 1). In examples, the first upper bound value is selected by generating a second sampled dataset, by sampling the dataset at a second sampling rate to the dataset, where the second sampling rate is selected to be a value between 10% and 50%; and identifying, using the modified ternary search algorithm, the first upper bound value, based on a first initial upper bound value and a first initial lower bound value that are selected for the second sampled dataset. In some cases, the first initial upper bound value is one of:

(i) a value of 1, for cosine-based neighborhood radius parameter values;
(ii) a maximum neighborhood radius parameter value, for other bounded neighborhood radius parameter values; or
(iii) a value of a sum of difference values between a maximum function and a minimum function of a distance variable, for unbounded neighborhood radius parameter values.

In some examples, the first lower bound value is selected by generating a third sampled dataset, by sampling dimensions (e.g., the number of clusters) of the dataset at a third sampling rate to the dataset, while maintaining a number of examples in the dataset, where the third sampling rate is selected to be a value between 10% and 50%. An example of sampling dimensions includes the following: Given N examples where each is represented with a D dimensional vector, during LB estimation each example may be represented using 20% of the D columns while ignoring the rest. The modified ternary search algorithm is then used to identify the first lower bound value, based on a second initial upper bound value and a second initial lower bound value that are selected for the third sampled dataset. In some instances, the second initial upper bound value is a number of dimensions of the dataset. The description above with respect to FIGS. 2B and 2C includes further details regarding selection of the first upper bound value and the first lower bound value.

Method 400A further includes, at operation 415, the density-based clustering system identifying, using a modified ternary search algorithm (e.g., modified ternary search algorithm 140 of FIG. 1), an optimal neighborhood radius parameter value (e.g., optimal neighborhood radius parameter value ($\varepsilon_{Opt}$) 165 of FIG. 1), based on the first upper bound value and the first lower bound value of the neighborhood radius parameter. The modified ternary search algorithm, when used for identifying the optimal neighborhood radius parameter value performs modified ternary search operations as described below with respect to FIG. 4C, and as described above with respect to FIG. 2B. The density-based clustering system subsequently performs at least one of: outputting the optimal neighborhood radius parameter value ($\varepsilon_{Opt}$) (at operation 420); or outputting an optimal number of clusters (e.g., optimal number of clusters ($k_{Opt}$) 170 of FIG. 1) within the dataset corresponding to the optimal neighborhood radius parameter value ($\varepsilon_{Opt}$) (at operation 425).

Referring to FIG. 4B, method 400B, at operation 430, is similar to operation 405 of method 400A (as shown in FIG. 4A), in that a density-based clustering system receives or accesses a dataset. At operation 435, the density-based clustering system generates a first sampled dataset, by sampling the dataset at a first sampling rate. In examples, the first sampling rate is selected to be a value between 10% and 90%. As described above with respect to FIG. 2A, as the sampling rate lowers, the neighborhood radius parameter value tends to shift to a higher value. The lower sampling rates, however, consume fewer computational resources for finding the optimal neighborhood radius parameter values and also takes less time to do so. A balance may be struck between accuracy (e.g., an optimal neighborhood radius parameter value for the sampled dataset) while achieving efficiency in terms of computational time and computational resources used, by selecting a sampling rate that is between about 50% and about 80%, for example.

Method 400B further includes, at operation 440, the density-based clustering system selecting, for the first sampled dataset, a first upper bound value and a first lower bound value of a neighborhood radius parameter ($\varepsilon$) of a density-based clustering algorithm, similar to operation 410 of method 400A (as shown in FIG. 4A). At operation 445, which is similar to operation 415 of method 400A (as shown in FIG. 4A), the density-based clustering system identifies, using a modified ternary search algorithm, an optimal neighborhood radius parameter value, based on the first upper bound value and the first lower bound value of the neighborhood radius parameter, by performing modified ternary operations. Performing the modified ternary search operations is further described below with respect to FIG. 4C, and is also described above with respect to FIG. 2B. The density-based clustering system subsequently performs at least one of: outputting the optimal neighborhood radius parameter value ($\varepsilon_{Opt}$) (at operation 450); or outputting an optimal or maximum number of clusters (e.g., optimal number of clusters ($k_{Opt}$) 170 of FIG. 1) within the first sampled dataset corresponding to the optimal neighborhood radius parameter value ($\varepsilon_{Opt}$) (at operation 455). Operations 450 and 455 are similar to operations 420 and 425 of method 400A (as shown in FIG. 4A).

Turning to FIG. 4C, performing modified ternary search operations (e.g., at operations 415 and 445 of methods 400A and 400B, respectively) includes following the processes as described below with respect to operations 460-485. At operation 460, the density-based clustering system identifies a first middle left value and a first middle right value of the neighborhood radius parameter, by dividing a first range of neighborhood radius parameter values between the first upper bound value and the first lower bound value into three equidistant sets of neighborhood radius parameter values. The first middle left value and the first middle right value mark corresponding middle boundaries between adjacent equidistant sets of neighborhood radius parameter values. The processes at operations 465-480 are repeated for a set number of iterations (e.g., between 3 and 20 iterations, ideally between 8 and 15 iterations for a balance between accuracy and costs in terms of resource usage and/or time). Method 400A or 400B further includes the density-based clustering system calculating, using the density-based clustering algorithm, a first number of clusters in the (first sampled) dataset, based on the first middle left value of the neighborhood radius parameter (at operation 465); and calculating, using the density-based clustering algorithm, a second number of clusters in the (first sampled) dataset, based on the first middle right value of the neighborhood radius parameter (at operation 470).

At operation 475, the density-based clustering system identifies in which equidistant set of neighborhood radius parameter values the optimal neighborhood radius parameter value is likely located, in some cases, by comparing the first number of clusters and the second number of clusters, based on a unimodal or a near-unimodal profile of the neighborhood radius parameter value. Herein, where a unimodal (or near-unimodal) function is a function that outputs a distribution or a set of values characterized by a single peak, a unimodal (or near-unimodal) behavior of the function or an algorithm refers to how the function or the algorithm works or acts to exhibit single peak behavior.

Relatedly, a unimodal (or near-unimodal) profile of the neighborhood radius parameter value refers to a single peak characteristic of the neighborhood radius parameter value. For example, for Cosine-based neighborhood radius parameter values, the maximum value of the neighborhood radius parameter value is 1, and beyond a certain neighborhood radius parameter value for most datasets the number of clusters converge on 1. That is, with a larger and larger neighborhood radius, all points are captured in a single neighborhood and thus the number of clusters converges toward or becomes 1. As the neighborhood radius parameter value drops toward 0, the number of clusters converges toward or becomes 0, because the neighborhood radius shrinks to a point that no core points can be found that have the requisite minimum number of neighbors. In some examples, as the neighborhood radius parameter value increases from 0 and 1, there is a monotonic increase followed by a monotonic decrease in the number of clusters, as shown, e.g., in FIGS. 2A, 2C, and 3(a)-3(c) (FIG. 3(d) shows an almost monotonic increase followed by an almost monotonic decrease in the number of clusters). The optimal (or maximum) number of clusters occurs as the monotonic increase transitions to the monotonic decrease. Based on these characteristics of Cosine-based neighborhood radius parameter values, comparison between the first number of clusters and the second number of clusters can be used to identify which equidistant set of neighborhood radius parameter values the peak is likely located, which is indicative of where the optimal neighborhood radius parameter value is likely located. In the last iteration, the identified equidistant set of neighborhood radius parameter values is used as the basis for identifying the optimal neighborhood radius parameter value for the (first sampled) dataset, as described below with respect to operation 485.

For all iterations except the last iteration, method 400B, at operation 480, includes the density-based clustering system setting, based on the identified equidistant set of neighborhood radius parameter values, a second upper bound value and a second lower bound value to correspond to one of the following pairs of values:

(1) the first upper bound value and the first middle right value, respectively;

(2) the first middle right value and the first middle left value, respectively; or (3) the first middle left value and the first lower bound value, respectively.

For all iterations except the last iteration, method 400B returns to the process at operation 465 and the operations 465-480 are repeated until after the last iteration. After the last iteration, method 400B continues onto the process at operation 485. At operation 485, the density-based clustering system identifies the optimal neighborhood radius parameter value, by using a convergence algorithm (e.g., convergence algorithm 145 of FIG. 1) on neighborhood radius parameter values within the equidistant set of neighborhood radius parameter values that is identified in the last iteration. In this manner, an accurate optimal neighborhood radius parameter value may be calculated with greater efficiency in terms of speed and resource usage.

While the techniques and procedures in methods 400A and 400B are depicted and/or described in a certain order for purposes of illustration, it should be appreciated that certain procedures may be reordered and/or omitted within the scope of various embodiments. Moreover, while the methods 400A and 400B may be implemented by or with (and, in some cases, are described below with respect to) the systems, examples, or embodiments 100, 200A, 200B, 200C, and 300 of FIGS. 1, 2A, 2B, 2C, and 3, respectively (or components thereof), such methods may also be implemented using any suitable hardware (or software) implementation. Similarly, while each of the systems, examples, or embodiments 100, 200A, 200B, 200C, and 300 of FIGS. 1, 2A, 2B, 2C, and 3, respectively (or components thereof), can operate according to the methods 400A and 400B (e.g., by executing instructions embodied on a computer readable medium), the systems, examples, or embodiments 100, 200A, 200B, 200C, and 300 of FIGS. 1, 2A, 2B, 2C, and 3 can each also operate according to other modes of operation and/or perform other suitable procedures.

As should be appreciated from the foregoing, the present technology provides multiple technical benefits and solutions to technical problems. For instance, a common challenge with use of density-based clustering algorithms is difficulty in tuning for parameters such as the neighborhood radius parameter value $\varepsilon$. The present technology provides large-scale density-based clustering functionalities that utilizes a practical approach to parameter tuning in density-based clustering that leverages the near-unimodal property of $\varepsilon$. In particular, a modified ternary search algorithm is used that leverages this near-unimodal property as well as leveraging the characteristic that $\varepsilon$ increases as sampling rate $\alpha$ decreases to select an upper bound value for initializing the modified ternary search algorithm. Initializing the modified ternary search algorithm by selecting a lower bound value that takes the number of clusters k as a parameter instead of $\varepsilon$ further enhances the modified ternary search algorithm for identifying the optimal neighborhood radius parameter value $\varepsilon$. The present techniques are not bound to a specific domain. Tests using the present techniques for various tasks—such as for various Vision tasks, NLP clustering tasks, and Audio clustering tasks—have been shown to perform better compared with alternative techniques when applied on high-dimensional big data (e.g., large N and large D). Some specific domain examples for which the present techniques may be used include:

(a) Image Classification of Objects (e.g., based on ImageNet1k dataset data);

(b) Image Classification of Faces (e.g., based on Labeled Faces in the Wild-LFW dataset data);

(c) Image Classification of Animated Characters (e.g., based on CAST dataset data);

(d) Document Classification (e.g., based on Reuters dataset data);

(e) Audio Effect Classification (e.g., based on ESC-50 dataset data);

(f) Biological Object Classification; and/or (g) Action Recognition in Videos (e.g., based on Kinetics-400 dataset data).

Figure 5:
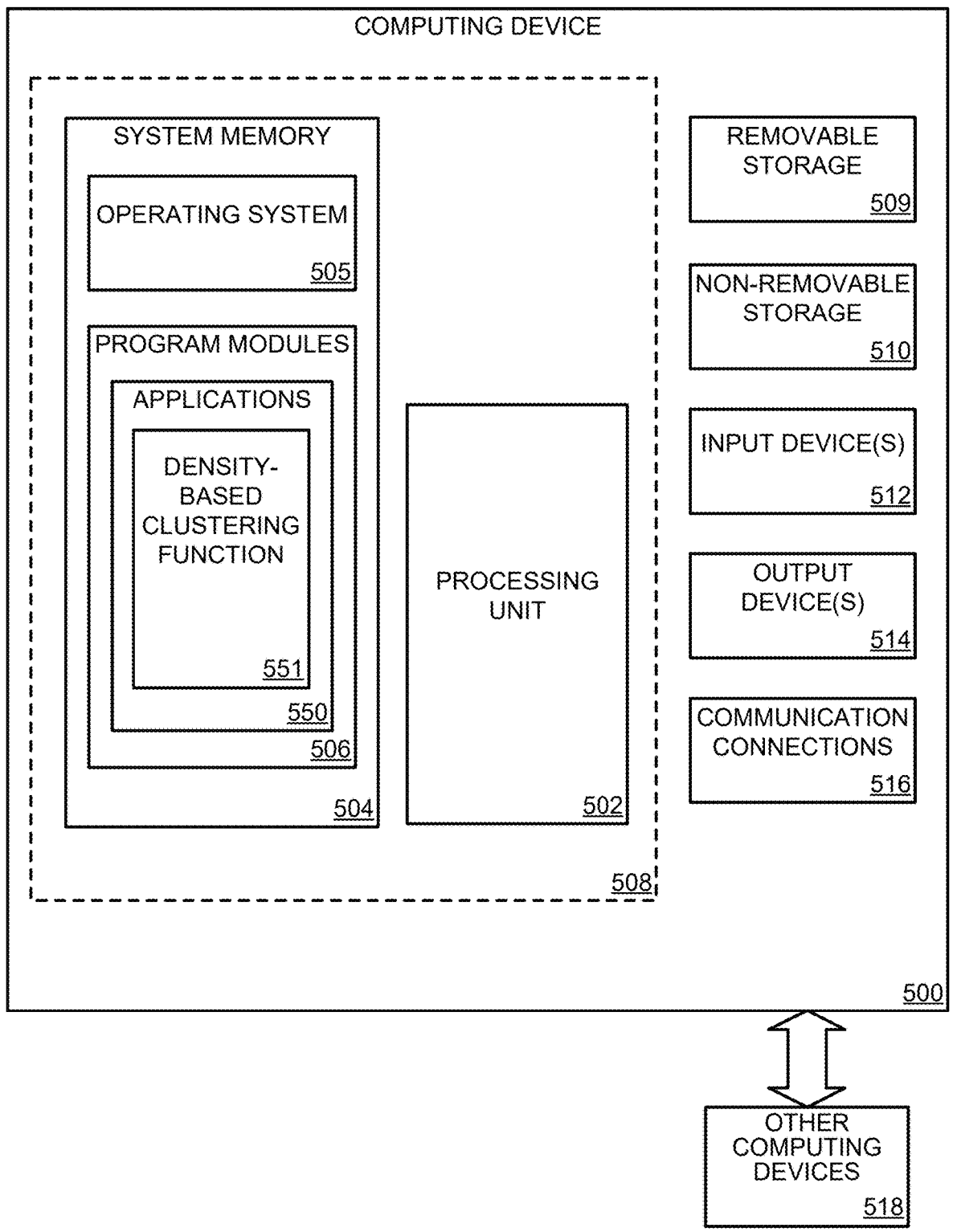
FIG. 5 depicts a block diagram illustrating example physical components of a computing device with which aspects of the technology may be practiced.

FIG. 5 depicts a block diagram illustrating physical components (i.e., hardware) of a computing device 500 with which examples of the present disclosure may be practiced. The computing device components described below may be suitable for a client device implementing the large-scale density-based clustering functionalities, as discussed above. In a basic configuration, the computing device 500 may include at least one processing unit 502 and a system memory 504. The processing unit(s) (e.g., processors) may be referred to as a processing system. Depending on the configuration and type of computing device, the system memory 504 may include volatile storage (e.g., random access memory), non-volatile storage (e.g., read-only memory), flash memory, or any combination of such memories. The system memory 504 may include an operating system 505 and one or more program modules 506 suitable for running software applications 550, such as density-based clustering function 551, to implement one or more of the systems or methods described above.

The operating system 505, for example, may be suitable for controlling the operation of the computing device 500. Furthermore, aspects of the invention may be practiced in conjunction with a graphics library, other operating systems, or any other application program and is not limited to any particular application or system. This basic configuration is illustrated in FIG. 5 by those components within a dashed line 508. The computing device 500 may have additional features or functionalities. For example, the computing device 500 may also include additional data storage devices (which may be removable and/or non-removable), such as, for example, magnetic disks, optical disks, or tape. Such additional storage is illustrated in FIG. 5 by a removable storage device(s) 509 and a non-removable storage device(s) 510.

As stated above, a number of program modules and data files may be stored in the system memory 504. While executing on the processing unit 502, the program modules 506 may perform processes including one or more of the operations of the method(s) as illustrated in FIGS. 4A-4C, or one or more operations of the system(s) and/or apparatus(es) as described with respect to FIGS. 1-3, or the like. Other program modules that may be used in accordance with examples of the present disclosure may include applications such as electronic mail and contacts applications, word processing applications, spreadsheet applications, database applications, slide presentation applications, drawing or computer-aided application programs, artificial intelligence ("AI") applications and machine learning ("ML") modules on cloud-based systems, etc.

Furthermore, examples of the present disclosure may be practiced in an electrical circuit including discrete electronic elements, packaged or integrated electronic chips containing logic gates, a circuit utilizing a microprocessor, or on a single chip containing electronic elements or microprocessors. For example, examples of the present disclosure may be practiced via a system-on-a-chip ("SOC") where each or many of the components illustrated in FIG. 5 may be integrated onto a single integrated circuit. Such an SOC device may include one or more processing units, graphics units, communications units, system virtualization units and various application functionalities all of which may be integrated (or "burned") onto the chip substrate as a single integrated circuit. When operating via an SOC, the functionality, described herein, with respect to generating suggested queries, may be operated via application-specific logic integrated with other components of the computing device 500 on the single integrated circuit (or chip). Examples of the present disclosure may also be practiced using other technologies capable of performing logical operations such as, for example, AND, OR, and NOT, including mechanical, optical, fluidic, and/or quantum technologies.

The computing device 500 may also have one or more input devices 512 such as a keyboard, a mouse, a pen, a sound input device, and/or a touch input device, etc. The output device(s) 514 such as a display, speakers, and/or a printer, etc. may also be included. The aforementioned devices are examples and others may be used. The computing device 500 may include one or more communication connections 516 allowing communications with other computing devices 518. Examples of suitable communication connections 516 include radio frequency ("RF") transmitter, receiver, and/or transceiver circuitry; universal serial bus ("USB"), parallel, and/or serial ports; and/or the like.

The term "computer readable media" as used herein may include computer storage media. Computer storage media may include volatile and nonvolatile, and/or removable and non-removable, media that may be implemented in any method or technology for storage of information, such as computer readable instructions, data structures, or program modules. The system memory 504, the removable storage device 509, and the non-removable storage device 510 are all computer storage media examples (i.e., memory storage). Computer storage media may include random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500. Computer storage media may be non-transitory and tangible, and computer storage media do not include a carrier wave or other propagated data signal.

Communication media may be embodied by computer readable instructions, data structures, program modules, or other data in a modulated data signal, such as a carrier wave or other transport mechanism, and may include any information delivery media. The term "modulated data signal" may describe a signal that has one or more characteristics that are set or changed in such a manner as to encode information in the signal. By way of example, communication media may include wired media such as a wired network or direct-wired connection, and wireless media such as acoustic, RF, infrared, and other wireless media.

In this detailed description, wherever possible, the same reference numbers are used in the drawing and the detailed description to refer to the same or similar elements. In some instances, a sub-label is associated with a reference numeral to denote one of multiple similar components. When reference is made to a reference numeral without specification to an existing sub-label, it is intended to refer to all such multiple similar components. In some cases, for denoting a plurality of components, the suffixes "a" through "n" may be used, where n denotes any suitable non-negative integer number (unless it denotes the number 14, if there are components with reference numerals having suffixes "a" through "m" preceding the component with the reference numeral having a suffix "n"), and may be either the same or different from the suffix "n" for other components in the same or different figures. For example, for component #1 X05a-X05n, the integer value of n in X05n may be the same or different from the integer value of n in X10n for component #2 X10a-X10n, and so on. In other cases, other suffixes (e.g., s, t, u, v, w, x, y, and/or z) may similarly denote non-negative integer numbers that (together with n or other like suffixes) may be either all the same as each other, all different from each other, or some combination of same and different (e.g., one set of two or more having the same values with the others having different values, a plurality of sets of two or more having the same value with the others having different values).

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components including one unit and elements and components that include more than one unit, unless specifically stated otherwise.

In this detailed description, for the purposes of explanation, numerous specific details are set forth to provide a thorough understanding of the described embodiments. It will be apparent to one skilled in the art, however, that other embodiments of the present invention may be practiced without some of these specific details. In other instances, certain structures and devices are shown in block diagram form. While aspects of the technology may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the detailed description does not limit the technology, but instead, the proper scope of the technology is defined by the appended claims. Examples may take the form of a hardware implementation, or an entirely software implementation, or an implementation combining software and hardware aspects. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features. The detailed description is, therefore, not to be taken in a limiting sense.

Aspects of the present invention, for example, are described above with reference to block diagrams and/or operational illustrations of methods, systems, and computer program products according to aspects of the invention. The functions and/or acts noted in the blocks may occur out of the order as shown in any flowchart. For example, two blocks shown in succession may in fact be executed substantially concurrently or the blocks may sometimes be executed in the reverse order, depending upon the functionalities and/or acts involved. Further, as used herein and in the claims, the phrase "at least one of element A, element B, or element C" (or any suitable number of elements) is intended to convey any of: element A, element B, element C, elements A and B, elements A and C, elements B and C, and/or elements A, B, and C (and so on).

The description and illustration of one or more aspects provided in this application are not intended to limit or restrict the scope of the invention as claimed in any way. The aspects, examples, and details provided in this application are considered sufficient to convey possession and enable others to make and use the best mode of the claimed invention. The claimed invention should not be construed as being limited to any aspect, example, or detail provided in this application. Regardless of whether shown and described in combination or separately, the various features (both structural and methodological) are intended to be selectively rearranged, included, or omitted to produce an example or embodiment with a particular set of features. Having been provided with the description and illustration of the present application, one skilled in the art may envision variations, modifications, and alternate aspects, examples, and/or similar embodiments falling within the spirit of the broader aspects of the general inventive concept embodied in this application that do not depart from the broader scope of the claimed invention.

What is claimed is:

1. A system, comprising:
   a processing system; and
   a memory coupled to the processing system, the memory comprising computer executable instructions that, when executed by the processing system, causes the system to perform operations comprising:
   receiving a dataset including embeddings of at least one of words, objects in an image, or objects in a video;
   selecting, for the dataset, a first upper bound value and a first lower bound value of a neighborhood radius parameter of a density-based clustering algorithm;
   identifying, using a modified ternary search algorithm based on near-unimodality of the neighborhood radius parameter as a variant of ternary search algorithm, an optimal neighborhood radius parameter value, based on the first upper bound value and the first lower bound value of the neighborhood radius parameter;
   providing as output performing at least one of:
   outputting the optimal neighborhood radius parameter value; or
   outputting an optimal number of clusters within the dataset corresponding to the optimal neighborhood radius parameter value; and
   based on the output, clustering the at least one of words, objects in the image, or objects in the video associated with the dataset.

2. The system of claim 1, wherein the optimal neighborhood radius parameter value is identified by performing modified ternary search operations comprising:
   dividing a first range of neighborhood radius parameter values between the first upper bound value and the first lower bound value into three equidistant sets of neighborhood radius parameter values, the three equidistant sets corresponding to a left region, a middle region, and a right region, with a first middle boundary between the left region and the middle region, and with a second middle boundary between the middle region and the right region;
   comparing a first number of clusters for the first middle boundary with a second number of clusters for the second middle boundary, the first number of clusters and the second number of clusters each being calculated using the density-based clustering algorithm;
   identifying in which of the left region, the middle region, and the right region the optimal neighborhood radius parameter value is likely located, based on a unimodal or a near-unimodal profile of the neighborhood radius parameter value;
   repeating for a set number of iterations, the dividing, the comparing, and the identifying processes for the identified one of the left region, the middle region, and the right region in an immediately preceding iteration; and
   identifying optimal neighborhood radius parameter value, by using a convergence algorithm on neighborhood radius parameter values within the one of the left region, the middle region, and the right region that is identified in the last iteration.

3. The system of claim 1, wherein the optimal neighborhood radius parameter value is identified by performing modified ternary search operations comprising:
   identifying a first middle left value and a first middle right value of the neighborhood radius parameter, by dividing a first range of neighborhood radius parameter values between the first upper bound value and the first lower bound value into three equidistant sets of neighborhood radius parameter values, wherein the first middle left value and the first middle right value mark corresponding middle boundaries between adjacent equidistant sets of neighborhood radius parameter values;
   repeating the following operations for a set number of iterations:
      calculating, using the density-based clustering algorithm, a first number of clusters in the dataset, based on the first middle left value of the neighborhood radius parameter;
      calculating, using the density-based clustering algorithm, a second number of clusters in the dataset, based on the first middle right value of the neighborhood radius parameter;
      identifying in which equidistant set of neighborhood radius parameter values the optimal neighborhood radius parameter value is likely located, by comparing the first number of clusters and the second number of clusters, based on a unimodal or a near-unimodal profile of the neighborhood radius parameter value; and
      for all iterations except the last iteration, setting, based on the identified equidistant set of neighborhood radius parameter values, a second upper bound value and a second lower bound value to correspond to one of the following pairs of values:
      the first upper bound value and the first middle right value, respectively;
      the first middle right value and the first middle left value, respectively; or
      the first middle left value and the first lower bound value, respectively; and
      identifying the optimal neighborhood radius parameter value, by using a convergence algorithm on neighborhood radius parameter values within the equidistant set of neighborhood radius parameter values that is identified in the last iteration.

4. The system of claim 3, wherein the operations further comprise:
   generating a first sampled dataset, by sampling the dataset at a first sampling rate, wherein the first sampling rate is selected to be a value between 10% and 90%;
   wherein calculating each of the first number of clusters and the second number of clusters is performed on the first sampled dataset, using the density-based clustering algorithm; and
   wherein the outputted optimal number of clusters is calculated, using density-based clustering algorithm being performed on the first sampled dataset, based on the optimal neighborhood radius parameter value.

5. The system of claim 4, wherein the optimal neighborhood radius parameter value is a maximum calculated neighborhood radius parameter value that is calculated based on the first sampled dataset.

6. The system of claim 1, wherein the first upper bound value is selected by:
   generating a second sampled dataset, by sampling the dataset at a second sampling rate, wherein the second sampling rate is selected to be a value between 10% and 50%; and
   identifying, using the modified ternary search algorithm, the first upper bound value, based on a first initial upper bound value and a first initial lower bound value that are selected for the second sampled dataset;
   wherein the first initial upper bound value is one of:
      a value of 1, for cosine-based neighborhood radius parameter values;
      a maximum neighborhood radius parameter value, for other bounded neighborhood radius parameter values; or
      a value of a sum of difference values between a maximum function and a minimum function of a distance variable, for unbounded neighborhood radius parameter values.

7. The system of claim 6, wherein the first lower bound value is selected by:
   generating a third sampled dataset, by sampling dimensions of the dataset at a third sampling rate, while maintaining a number of examples in the dataset, wherein the third sampling rate is selected to be a value between 10% and 50%; and
   identifying, using the modified ternary search algorithm, the first lower bound value, based on a second initial upper bound value and a second initial lower bound value that are selected for the third sampled dataset;
   wherein the second initial upper bound value is a number of dimensions of the dataset.

8. A computer-implemented method, comprising:
   generating a first sampled dataset, by sampling a dataset at a first sampling rate, wherein the dataset includes embeddings of at least one of words, objects in an image, or objects in a video;
   selecting, for the first sampled dataset, a first upper bound value and a first lower bound value of a neighborhood radius parameter of a density-based clustering algorithm;
   identifying, using a modified ternary search algorithm, an optimal neighborhood radius parameter value, based on the first upper bound value and the first lower bound value of the neighborhood radius parameter, by performing modified ternary search operations comprising:
      identifying a first middle left value and a first middle right value of the neighborhood radius parameter, by dividing a first range of neighborhood radius parameter values between the first upper bound value and the first lower bound value into three equidistant sets of neighborhood radius parameter values, wherein the first middle left value and the first middle right value mark corresponding middle boundaries between adjacent equidistant sets of neighborhood radius parameter values;
      repeating the following operations for a set number of iterations:
         calculating, using the density-based clustering algorithm, a first number of clusters in the first sampled dataset, based on the first middle left value of the neighborhood radius parameter;
         calculating, using the density-based clustering algorithm, a second number of clusters in the first sampled dataset, based on the first middle right value of the neighborhood radius parameter;

identifying in which equidistant set of neighborhood radius parameter values the optimal neighborhood radius parameter value is likely located, by comparing the first number of clusters and the second number of clusters, based on a unimodal or a near-unimodal profile of the neighborhood radius parameter value; and for all iterations except the last iteration, setting, based on the identified equidistant set of neighborhood radius parameter values, a second upper bound value and a second lower bound value to correspond to one of the following pairs of values:
the first upper bound value and the first middle right value, respectively;
the first middle right value and the first middle left value, respectively; or
the first middle left value and the first lower bound value, respectively; and identifying the optimal neighborhood radius parameter value, by using a convergence algorithm on neighborhood radius parameter values within the equidistant set of neighborhood radius parameter values that is identified in the last iteration;

providing as output at least one of the optimal neighborhood radius parameter value or an optimal number of clusters within the first sampled dataset corresponding to the optimal neighborhood radius parameter value; and based on the output, clustering the at least one of words, objects in the image, or objects in the video associated with the dataset.

9. The computer-implemented method of claim 8, wherein the dataset and the first sampled dataset include embeddings, wherein the embeddings are numerical representations of images, videos, audio signal, words, code, data signals, or electromagnetic spectrum signals.

10. The computer-implemented method of claim 8, wherein the first sampling rate is selected to be a value between 10% and 90%.

11. The computer-implemented method of claim 8, wherein the optimal neighborhood radius parameter value is a maximum calculated neighborhood radius parameter value that is calculated based on the first sampled dataset.

12. The computer-implemented method of claim 8, wherein the first upper bound value is selected by:
generating a second sampled dataset, by sampling the dataset at a second sampling rate, wherein the second sampling rate is selected to be a value between 10% and 50%; and
identifying, using the modified ternary search algorithm, the first upper bound value, based on a first initial upper bound value and a first initial lower bound value that are selected for the second sampled dataset;
wherein the first initial upper bound value is one of:
a value of 1, for cosine-based neighborhood radius parameter values;
a maximum neighborhood radius parameter value, for other bounded neighborhood radius parameter values; or
a value of a sum of difference values between a maximum function and a minimum function of a distance variable, for unbounded neighborhood radius parameter values.

13. The computer-implemented method of claim 12, wherein the first lower bound value is selected by:

generating a third sampled dataset, by sampling dimensions of the dataset at a third sampling rate, while maintaining a number of examples in the dataset, wherein the third sampling rate is selected to be a value between 10% and 50%; and identifying, using the modified ternary search algorithm, the first lower bound value, based on a second initial upper bound value and a second initial lower bound value that are selected for the third sampled dataset;

wherein the second initial upper bound value is a number of dimensions of the dataset.

14. A system, comprising:
a processing system; and
a memory coupled to the processing system, the memory comprising computer executable instructions that, when executed by the processing system, causes the system to perform operations comprising:
generating a first sampled dataset, by sampling a dataset at a first sampling rate, the dataset including embeddings of at least one of words, objects in an image, or objects in a video;
selecting, for the first sampled dataset, a first upper bound value and a first lower bound value of a neighborhood radius parameter of a density-based clustering algorithm;
identifying, using a modified ternary search algorithm based on near-unimodality of the neighborhood radius parameter as a variant of ternary search algorithm, an optimal neighborhood radius parameter value, based on the first upper bound value and the first lower bound value of the neighborhood radius parameter;
providing as output at least one of:
the optimal neighborhood radius parameter value; or
an optimal or maximum number of clusters within the first sampled dataset corresponding to the optimal neighborhood radius parameter value; and
based on the output, clustering the at least one of words, objects in the image, or objects in the video associated with the dataset.

15. The system of claim 14, wherein the embeddings are numerical representations of images, videos, audio signal, words, code, data signals, or electromagnetic spectrum signals.

16. The system of claim 14, wherein the first sampling rate is selected to be a value between 10% and 90%.

17. The system of claim 14, wherein the optimal neighborhood radius parameter value is identified by performing modified ternary search operations comprising:
dividing a first range of neighborhood radius parameter values between the first upper bound value and the first lower bound value into three equidistant sets of neighborhood radius parameter values, the three equidistant sets corresponding to a left region, a middle region, and a right region, with a first middle boundary between the left region and the middle region, and with a second middle boundary between the middle region and the right region;
comparing a first number of clusters for the first middle boundary with a second number of clusters for the second middle boundary, the first number of clusters and the second number of clusters each being calculated using the density-based clustering algorithm;
identifying in which of the left region, the middle region, and the right region the optimal neighborhood radius parameter value is likely located, based on a unimodal or a near-unimodal profile of the neighborhood radius parameter value;

repeating for a set number of iterations, the dividing, the comparing, and the identifying processes for the identified one of the left region, the middle region, and the right region in an immediately preceding iteration; and identifying optimal neighborhood radius parameter value, by using a convergence algorithm on neighborhood radius parameter values within the one of the left region, the middle region, and the right region that is identified in the last iteration.

18. The system of claim 14, wherein the optimal neighborhood radius parameter value is identified by performing modified ternary search operations comprising:

identifying a first middle left value and a first middle right value of the neighborhood radius parameter, by dividing a first range of neighborhood radius parameter values between the first upper bound value and the first lower bound value into three equidistant sets of neighborhood radius parameter values, wherein the first middle left value and the first middle right value mark corresponding middle boundaries between adjacent equidistant sets of neighborhood radius parameter values;

repeating the following operations for a set number of iterations:

calculating, using the density-based clustering algorithm, a first number of clusters in the first sampled dataset, based on the first middle left value of the neighborhood radius parameter;

calculating, using the density-based clustering algorithm, a second number of clusters in the first sampled dataset, based on the first middle right value of the neighborhood radius parameter;

identifying in which equidistant set of neighborhood radius parameter values the optimal neighborhood radius parameter value is likely located, by comparing the first number of clusters and the second number of clusters, based on a unimodal or a near-unimodal profile of the neighborhood radius parameter value; and for all iterations except the last iteration, setting, based on the identified equidistant set of neighborhood radius parameter values, a second upper bound value and a second lower bound value to correspond to one of the following pairs of values:

the first upper bound value and the first middle right value, respectively;

the first middle right value and the first middle left value, respectively; or the first middle left value and the first lower bound value, respectively; and identifying the optimal neighborhood radius parameter value, by using a convergence algorithm on neighborhood radius parameter values within the equidistant set of neighborhood radius parameter values that is identified in the last iteration.

19. The system of claim 14, wherein the first upper bound value is selected by:

generating a second sampled dataset, by sampling the dataset at a second sampling rate, wherein the second sampling rate is selected to be a value between 10% and 50%; and identifying, using the modified ternary search algorithm, the first upper bound value, based on a first initial upper bound value and a first initial lower bound value that are selected for the second sampled dataset;

wherein the first initial upper bound value is one of:

a value of 1, for cosine-based neighborhood radius parameter values;

a maximum neighborhood radius parameter value, for other bounded neighborhood radius parameter values; or a value of a sum of difference values between a maximum function and a minimum function of a distance variable, for unbounded neighborhood radius parameter values.

20. The system of claim 19, wherein the first lower bound value is selected by:

generating a third sampled dataset, by sampling dimensions of the dataset at a third sampling rate, while maintaining a number of examples in the dataset, wherein the third sampling rate is selected to be a value between 10% and 50%; and identifying, using the modified ternary search algorithm, the first lower bound value, based on a second initial upper bound value and a second initial lower bound value that are selected for the third sampled dataset;

wherein the second initial upper bound value is a number of dimensions of the dataset.

* * * * *